United States Patent
Caldicott

(10) Patent No.: US 9,776,255 B2
(45) Date of Patent: Oct. 3, 2017

(54) SYSTEM AND METHOD FOR MACHINING BLADES, BLISKS AND AEROFOILS

(71) Applicant: Delcam Limited, Birmingham, West Midlands (GB)

(72) Inventor: Ian Darren Caldicott, Birmingham (GB)

(73) Assignee: Delcam Limited, Birmingham, West Midlands (GB)

( * ) Notice: Subject to any disclaimer, the term of this patent is extended or adjusted under 35 U.S.C. 154(b) by 0 days.

(21) Appl. No.: 15/146,617

(22) Filed: May 4, 2016

(65) Prior Publication Data

US 2017/0095865 A1    Apr. 6, 2017

Related U.S. Application Data

(60) Provisional application No. 62/235,903, filed on Oct. 1, 2015.

(51) Int. Cl.
B23C 3/18    (2006.01)

(52) U.S. Cl.
CPC ............ *B23C 3/18* (2013.01); *B23C 2215/44* (2013.01)

(58) Field of Classification Search
CPC ... B23C 2220/605; B23C 3/18; B23P 15/006; B23P 15/02; B23P 15/04

(Continued)

(56) References Cited

U.S. PATENT DOCUMENTS 3,641,872 A * 2/1972 Ulfhielm ................ B23Q 33/00
                                                                409/115
4,445,182 A * 4/1984 Morita .................. G05B 19/182
                                                                318/572
(Continued)

FOREIGN PATENT DOCUMENTS

DE          19607192 A1 *  1/1997  ............... B23C 3/00
DE    10 2010 033 732 A1    2/2012
(Continued)

OTHER PUBLICATIONS

MAIS DE19607192 A1 Jan. 1997.*
(Continued)

*Primary Examiner* — Jason Vaughan
*Assistant Examiner* — Amanda Meneghin
(74) *Attorney, Agent, or Firm* — Fish & Richardson P.C.

(57) ABSTRACT

Systems and method relating to machining parts include a CNC system including CNC machining tools, and a computer including a processor and a computer-readable medium, wherein the computer-readable medium encodes instructions of a single NC program that, when run on the processor, causes the computer to control a selected CNC machining tool to perform operations including alternating between (i) moving the selected CNC machining tool along a semi-finishing toolpath segment using a first set of spindle speed and feed rate values to remove a next portion of rough stock material in a next region of a part being manufactured, and (ii) moving the selected CNC machining tool along a finishing toolpath segment to remove a semi-finishing thickness portion of the part in the next region, wherein the first set of spindle speed and feed rate values are different from the second set of spindle speed and feed rate values.

8 Claims, 16 Drawing Sheets

(58) Field of Classification Search
USPC ........ 700/172; 29/889.2, 889.7, 889.23, 557, 29/558; 409/131, 132
See application file for complete search history.

(56) References Cited

U.S. PATENT DOCUMENTS

| | | | | |
|---|---|---|---|---|
| 4,510,427 | A * | 4/1985 | Nozawa | G05B 19/40 318/443 |
| 5,055,752 | A * | 10/1991 | Leistensnider | B23C 3/18 318/570 |
| 5,954,464 | A * | 9/1999 | Dansereau | B23D 1/30 409/120 |
| 6,077,002 | A † | 6/2000 | Lowe | |
| 6,491,482 | B1 * | 12/2002 | Fenkl | B23C 3/00 29/889.7 |
| 6,676,344 | B1 * | 1/2004 | Amatt | G05B 19/40931 409/132 |
| 2013/0024021 | A1 | 1/2013 | Atabey | |

FOREIGN PATENT DOCUMENTS

| | | | | |
|---|---|---|---|---|
| EP | 1 195 226 A1 | 4/2002 | | |
| JP | EP 1195226 A1 * | 4/2002 | ......... | A61C 13/0004 |

OTHER PUBLICATIONS

Translation of Mais DE 19607192 A1.*
Unknown author, "Computer-aided manufacturing—Wikipedia, the free encyclopedia," (Sep. 29, 2015) [online] (retrieved from https://en.wikipedia.org/wiki/Computer-aided_manufacturing), 6 pages.
Unknown author, "Feeds and Speeds Tutorial for CNC," © 2012 by CNCCookbook, Inc., 79 pages.
Ding et al., "Flow Line Machining of Turbine Blades," Proceedings of the 2004 International Conference on Intelligent Mechatronics and Automation, Chengdu, China, 2004, pp. 140-145.
Authorized officer Sine Rasmussen, International Search Report and Written Opinion in Application No. PCT/IB2016/055811, mailed Jan. 11, 2017, 15 pages.
Plastics Today, "High-feed function cuts machining time," Aug. 22, 2008.†
Machinery's Handbook, New York, The Industrial Press, The Machinery Publishing Company, Ltd., 1915.†
Sculptured Surface Machining: Theory and Applications by Byoung K. Choi and Robert B. Jerard, Springer Science Buisiness Media, B.V., 1998.†
2013 MAX-PAC User's Guide, Concepts ETI, Inc.†
2002 MAX-5/MAX-AB User's Guide, Version 6.3, Concepts NREC, Aug. 2002†

\* cited by examiner
† cited by third party

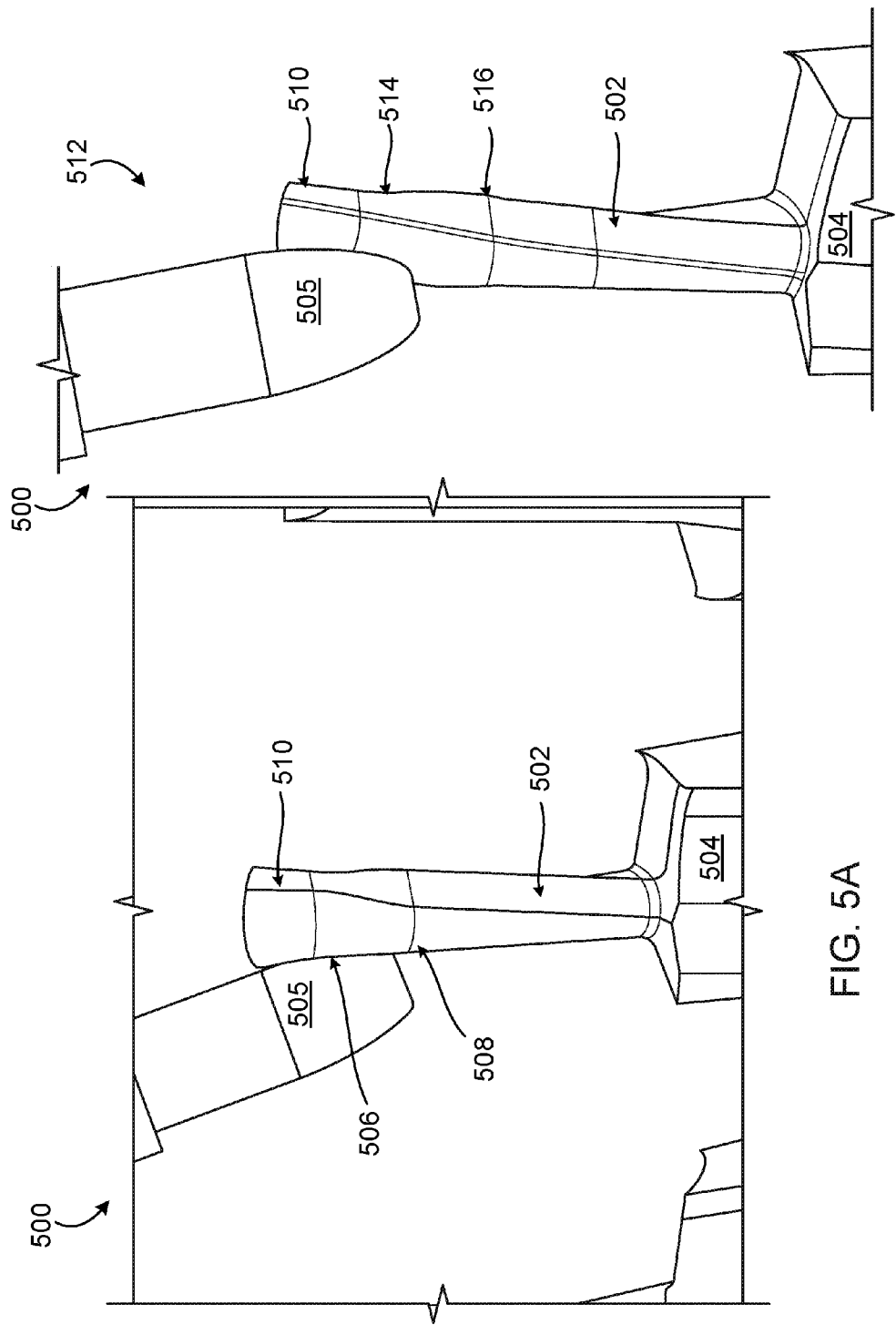

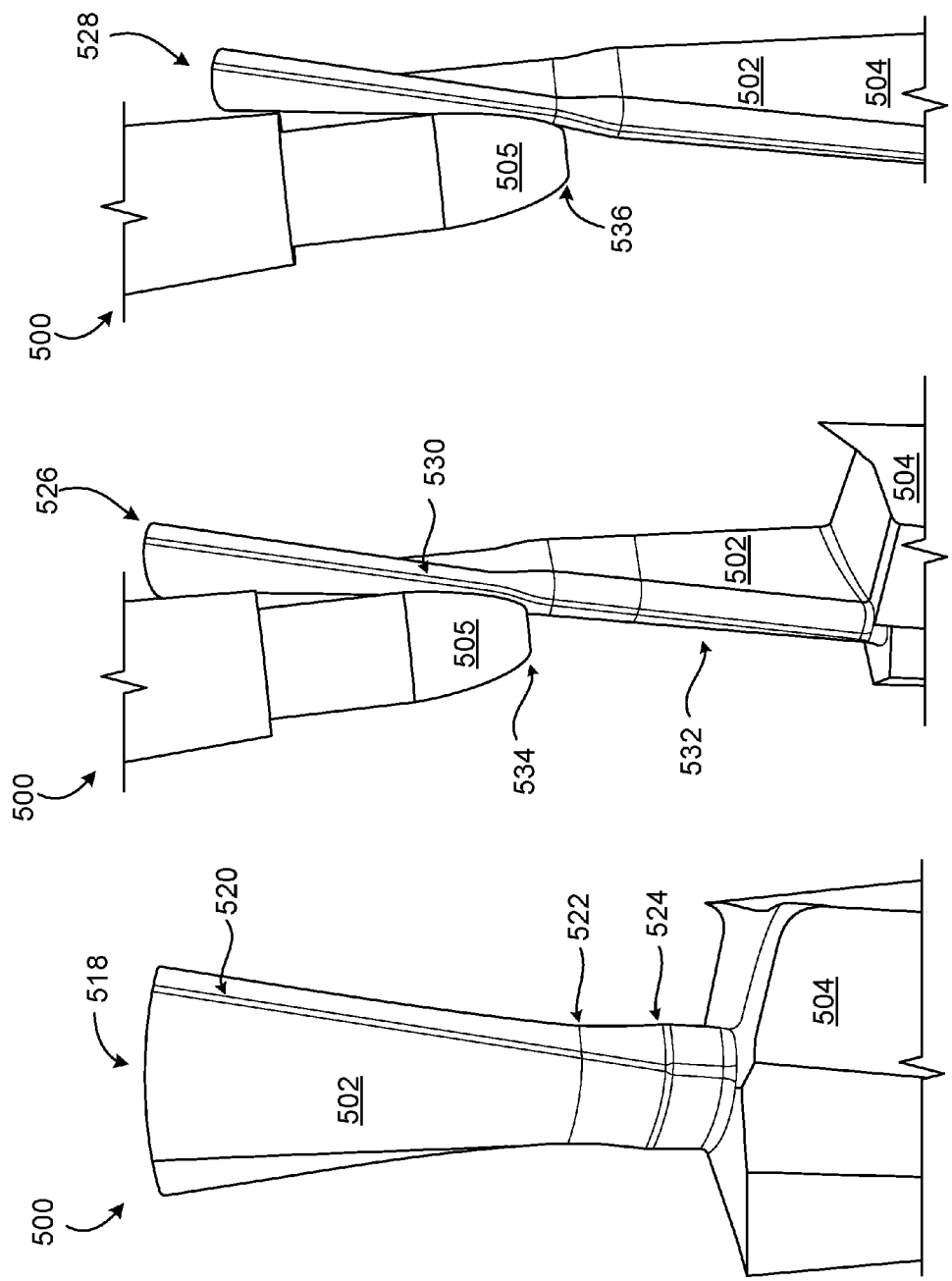

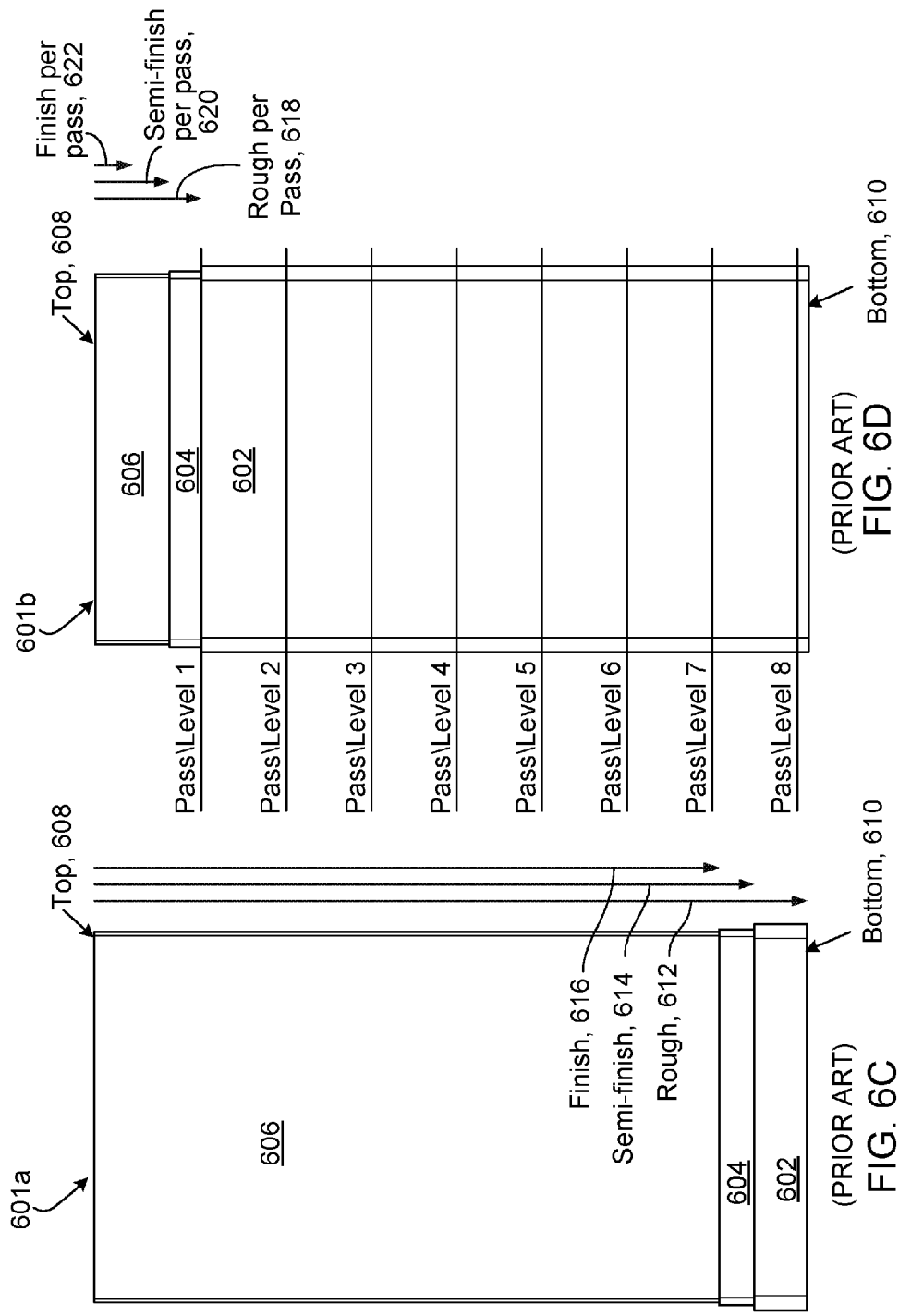
(PRIOR ART) FIG. 6D
(PRIOR ART) FIG. 6C

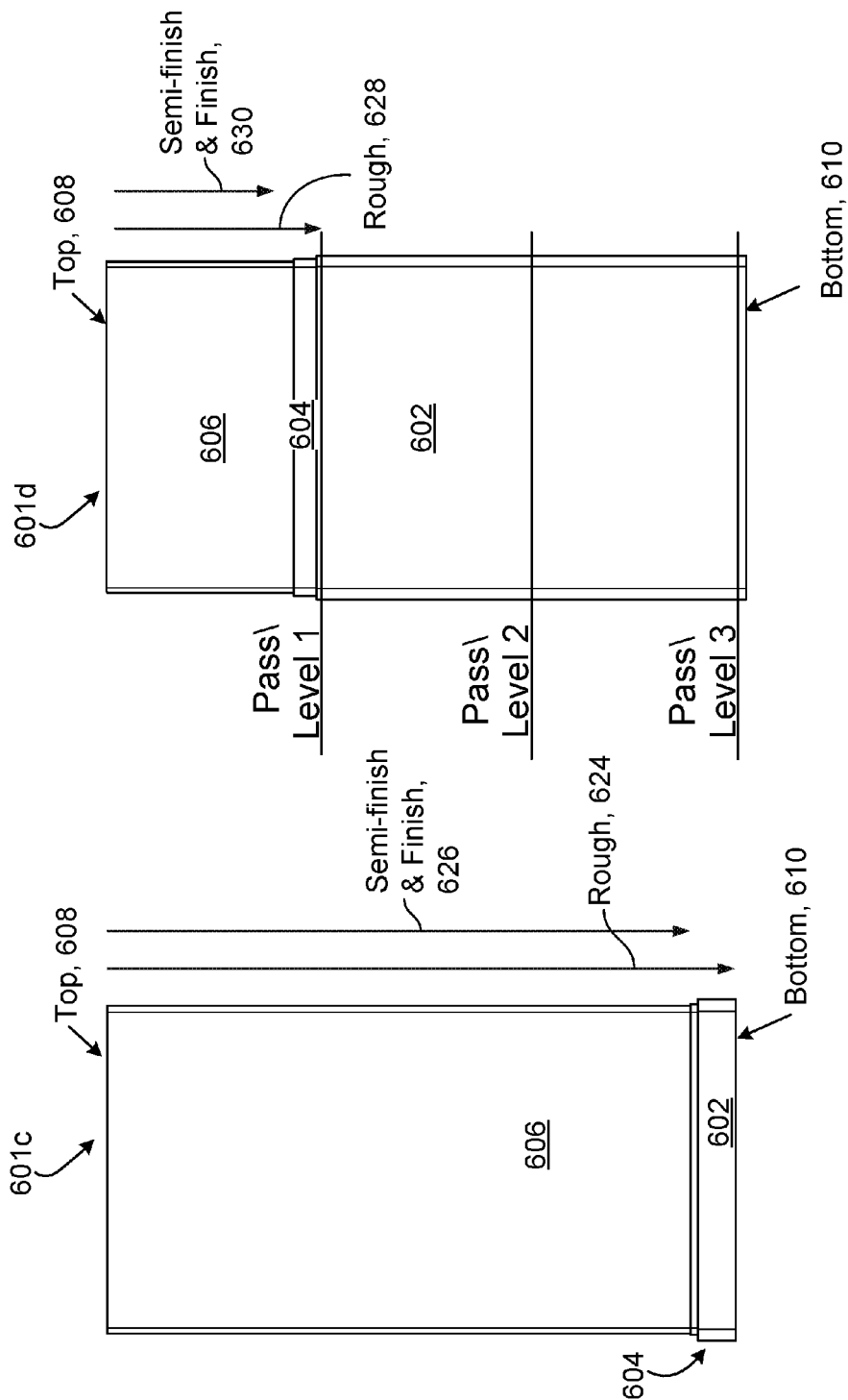

SYSTEM AND METHOD FOR MACHINING BLADES, BLISKS AND AEROFOILS

CROSS-REFERENCE TO RELATED APPLICATION

This application claims priority to U.S. Provisional Application No. 62/235,903, filed on Oct. 1, 2015. The disclosure of the prior application is considered part of and is incorporated by reference in the disclosure of this application.

BACKGROUND

This specification relates to machining blades, bladed disks, blisks and aerofoils, such as integrally bladed rotors or stators for turbine engines.

Blades are traditionally machined in large sections, one side at a time or in multiple levels, all of which have the sole purpose of providing supporting material to reduce vibration during the machining process. The machining process for a blade typically involves three separate process steps: (1) roughing out the blade, (2) performing a semi-finishing process on the blade, and (3) performing a final finishing process to get the final desired blade shape. The manufacturing costs of such traditional machining processes can be relatively high due to the time needed to perform the separate process steps of the machining process and the tool wear caused thereby.

In addition, when the final blade is thin (as is common for aerofoils) the material being machined gets sequentially thinner in each separate processing step. This means that the part being manufactured becomes less strong and more subject to distortion during the machining process. This can lead to inaccuracies and poor surface finish in the final product. In order to address this issue, some have employed a roughing out process that creates a terraced support structure to provide additional strength to the part for the subsequent semi-finishing and finishing processes.

FIGS. 2A-2B show an example of a terraced support structure created by a traditional Computer Numerical Control (CNC) milling process. After the initial process step of roughing out a blade 200, the blade 200 includes both the stock material 210, 212 left after the roughing operation, and also the finished desired blade form 220, which is still to be revealed in the CNC milling process. As shown in FIG. 2A, the material left on a component being created forms a support structure that is terraced in shape.

This terraced shape has two disadvantages: first, the non-uniform shape of the stock material 210, 212 has inherent weaknesses, and second, the non-uniform shape of the material means the milling cutter encounters uneven amounts of stock material that can lead to tool damage, wear and push off, leaving excess material on the component. FIG. 2B shows a larger view of a portion 230 that includes rough stock material of the blade 200 from FIG. 2A. As shown, extra stock material 240 is encountered by a cutting tool 250 when traditional terraced stock methods are used in a CNC process.

SUMMARY

This specification describes systems and methods relating to machining blades, bladed disks, blisks and aerofoils, such as integrally bladed rotors or stators for turbine engines, which can be used in aerospace and power generation applications. In particular, the traditionally separate process steps of semi-finishing and finishing can be combined as described herein. By combining semi-finishing and finishing, a machining tool can be directed to do a few semi-finishing slices, and then jump back up and do a couple finishing slices, and then jump back down and do a few more semi-finishing slices, etc. Because the machining tool is not going all the way down with the semi-finishing, the strength in the component can be retained. Thus, as the machining tool works its way down, a self-supporting thickness of material is maintained. This can allow one to increase the size of the component sections/levels processed and reduce the number of component sections/levels that need to be processed. In some cases, an entire blade can be machined (semi-finished and also finished) from top to bottom in one go.

In general, one or more aspects of the subject matter described in this specification can be embodied in a method including: first directing, using a single Numerical Control (NC) program, a single machining tool in a CNC system along a semi-finishing toolpath to remove a portion of rough stock material over a first distance, leaving behind a semi-finishing thickness portion; second directing, using the single NC program, the single machining tool in the CNC system along a finishing toolpath to remove the semi-finishing thickness portion over a second distance, wherein the second distance overlaps the first distance, and the second distance is shorter than the first distance by an offset distance set for the part; and repeating the first directing and the second directing, using the single NC program, such that the part remains self-supporting as the single machining tool alternates between semi-finishing and finishing toolpaths to form the part.

Aspects of this embodiment may include one or more of the following features. The part can be a blade or other components. The rough stock material can be a non-terraced rough stock, e.g., for the blade. Each of the first directing and the second directing can track fully around the part, and the repeating can continue for a full length of the part, until completion. Further, the first and second directing can be kept to a minimum between each repetition thereof for a given part, and the first directing (semi-finishing) can be limited to extend only a short distance farther than the second directing (finishing); for example, the first directing can consist of performing two to five semi-finishing slices, and the second directing can consist of performing two to four finishing slices.

The single NC program can contain multiple sets of spindle speed and feed rate controls that change depending on a current segment being either a semi-finishing segment or a finishing segment. The part can be an aerofoil, and the single NC program can use the multiple sets of spindle speed and feed rate controls to slow the single machining tool feed rate and spindle speed around leading and trailing edges of the aerofoil. The multiple sets of spindle speed and feed rate controls can include a first spindle speed and feed rate for concave and convex faces of the part, and a second spindle speed and feed rate for leading and trailing edges of the part.

The single NC program can specify a first set of spindle speed and feed rate values for the semi-finishing toolpath and a second set of spindle speed and feed rate values for the finishing toolpath, wherein the first set of spindle speed and feed rate values are different from the second set of spindle speed and feed rate values. The semi-finishing toolpath can include semi-finishing segments, the finishing toolpath can include finishing segments, the first set of spindle speed and feed rate values can include different spindle speed and feed rate values for different ones of the semi-finishing segments, and the second set of spindle speed and feed rate values can include different spindle speed and feed rate values for different ones of the finishing segments.

The method can include gradually speeding up and slowing down spindle speed and feed rate of the machining tool, by the same NC program, across a set distance when approaching or leaving one or more predefined portions of the part. The one or more predefined portions of the part can include corners of the part. The predefined portions of the part can include leading and trailing edges of the part.

In addition, one or more aspects of the subject matter described in this specification can be embodied in a non-transitory computer-readable medium encoding a Numerical Control (NC) program that, when run, causes a Computer Numerical Control (CNC) system to perform operations in accordance with any of the method embodiments. Furthermore, one or more aspects of the subject matter described in this specification can be embodied in a non-transitory computer-readable medium encoding a program (e.g., a Computer Aided Manufacturing (CAM) program) that generates such NC programs in accordance with any of the NC program and/or method embodiments.

One or more aspects of the subject matter described in this specification can also be embodied in a system including two or more CNC machining tools and a computer including a processor and a computer-readable medium, wherein the computer-readable medium encodes instructions of a single NC program that, when run on the processor causes the computer to control a selected one of the two or more CNC machining tools to perform operations including alternating between (i) moving the selected one of the two or more CNC machining tools along a semi-finishing toolpath segment using a first set of spindle speed and feed rate values to remove a next portion of rough stock material in a next region of a part being manufactured, and (ii) moving the selected one of the two or more CNC machining tools along a finishing toolpath segment to remove a semi-finishing thickness portion of the part in the next region, wherein the first set of spindle speed and feed rate values are different from the second set of spindle speed and feed rate values.

Aspects of this embodiment may include one or more of the following features. Each respective set of spindle speed and feed rate values can specify spindle speed and feed rate values for each point connecting segments of a toolpath. The operations can include slowing feed rate and spindle speed of the selected one of the two or more CNC machining tools around leading and trailing edges of the part. Further, the operations can include gradually speeding up and slowing down spindle speed and feed rate of the selected one of the two or more CNC machining tools across a set distance when approaching or leaving one or more predefined portions of the part. Finally, the CNC system can include a medium encoded program in accordance with any of the CAM program, NC program, and/or method embodiments.

Particular embodiments of the subject matter described in this specification can be implemented to realize one or more of the following advantages. Blades, bladed disks, blisks, aerofoils, etc., can be machined in less time and with superior finish. While more than one tool can be used in a Computer Numerical Control (CNC) system, a single CNC tool (selected from multiple available CNC tools in the CNC system) can be used at a time in a combined semi-finishing and finishing process, and tool life can be maintained or even extended using variable spindle speed and feed rate controls with the single CNC tool used in the combined semi-finishing and finishing process. The combined semi-finishing and finishing process can reduce stress exerted on a part during the part's manufacture, which can improve the quality of the finished part, and thus reduce the part's defect rate and probability of failure.

Required surface finish can be achieved with reduced cycle times, and blending between different sections/levels of a machined part can be improved. Mismatch between individually machined sections/levels and distortion away from the desired final blade form can be reduced. Moreover, surface finish quality can be improved across the entire length of a blade by changing the spindle speed and feed rate used with a CNC tool multiple times, in a controlled fashion, through a running cycle. In some implementations, variable spindle speed and feed rate controls can be used to ensure that semi-finishing and finishing segments of a single toolpath are running at optimal parameters so as to ensure a good tool life in addition to the improvements in resulting the machined part.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 5A-5E show a software simulation of a combined semi-finishing and finishing process in accordance with the detailed example of FIGS. 4A-4H.

FIGS. 6A-6F compare various machining processes with reference to a generalized aerofoil.

Like reference numbers and designations in the various drawings indicate like elements.

DETAILED DESCRIPTION

Figure 1:
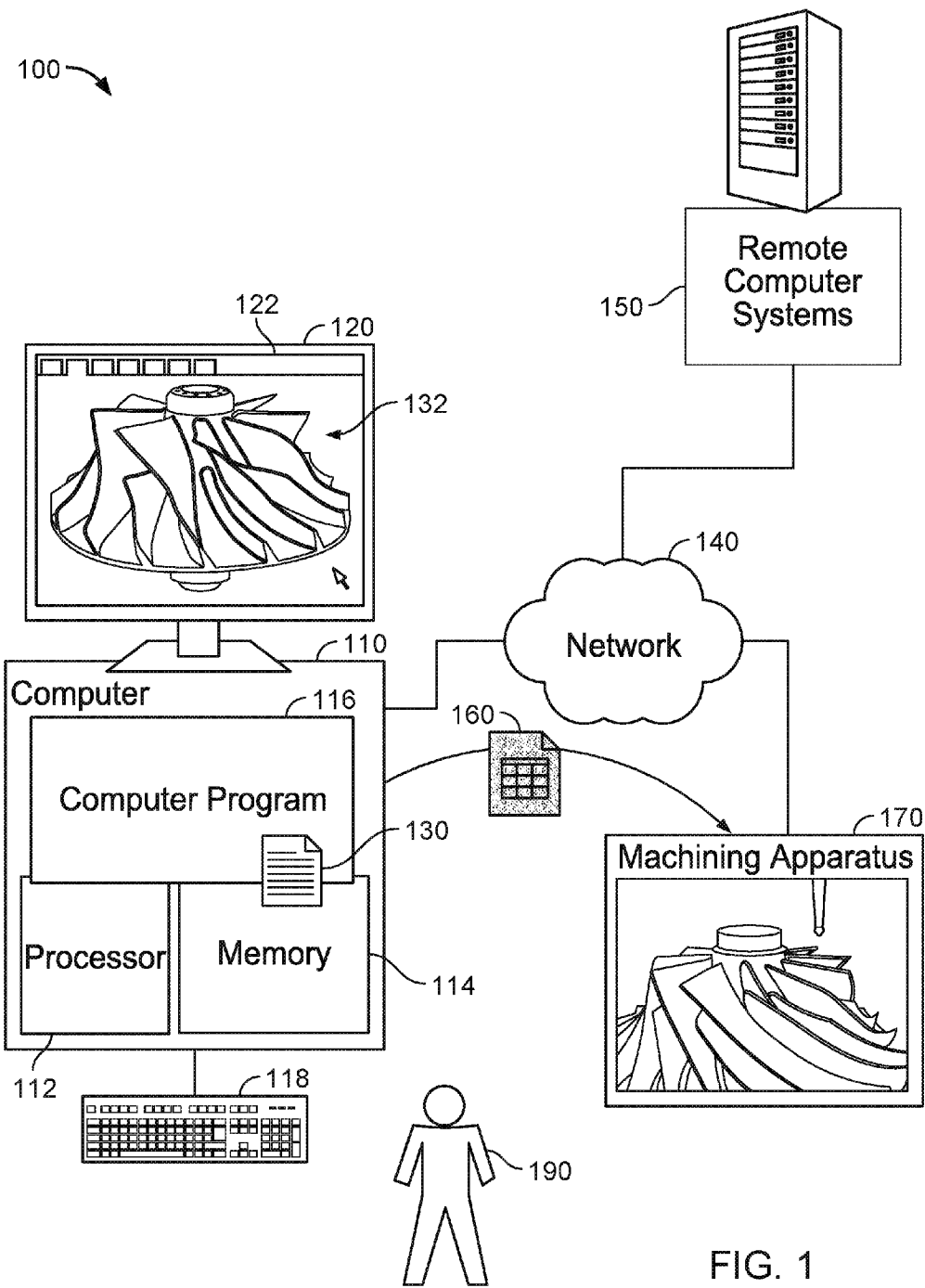
FIG. 1 shows an example of a Computer Numerical Control (CNC) system.

FIG. 1 shows an example of a Computer Numerical Control (CNC) system 100. A computer 110 includes a processor 112 and a computer-readable medium, such as a memory 114, a storage device, or both, to store instructions of one or more computer programs 116 that run on the processor 112. The computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114.

A computer program 116 can present a user interface (UI) 122 on a display device 120 of the computer 110, which can be operated using one or more input devices 118 of the computer 110 (e.g., keyboard and mouse). Note that, while shown as separate devices in FIG. 1, the display device 120 and/or input devices 118 can also be integrated with each other and/or with the computer 110, such as in a tablet computer. In addition, the CNC system 100 includes a machining apparatus 170, which includes one or more computer controlled machine tools. These can include, but are not limited to, all types of milling cutter tools, including those with ball nose, tapered, tip radius and barrel geometries. In addition, the machining apparatus 170 can include other components and systems, such as rotatable platforms/attachments (e.g., for five-axis milling processes) and cleaning systems (e.g., sprayed water cleaning systems).

The machining apparatus 170 can include its own computer 110, with processor 112, memory 114, computer program 116, etc. For example, in some implementations, the computer 110 and the machining apparatus 170 can be integrated together, without a network 140 connecting them. As another example, the machining apparatus 170 can include a computer that runs a Computer Aided Manufacturing (CAM) program which receives, as input, a model generated by a Computer Aided Design (CAD) program 116 and/or a Computer Aided Engineering (CAE) program 116 on a separate computer 110.

Alternatively, the machining apparatus 170 can simply be the machine tools and other manufacturing components that are controlled by the computer 110, and the computer program 116 can be a CAM program, which can receive as input a model generated by CAD and/or CAE programs located elsewhere. For example, one or more remote computer systems 150, which are accessible by the computer 110 via the network 140, can include CAD programs and CAE programs used to generate models that are input to and processed by a CAM program 116.

In any case, a CAM system can be provided that allows a user 190 to interact with a model 132 and readily generate a numerical control (NC) program 130 to operate machining apparatus 170. In the example shown, the model 132 is a 3D model of a particular blisk, but many different types of models can be used with the system and techniques described herein. Further, in some implementations, the NC program 130 runs on the processor 112 to control the machining apparatus 170 directly connected thereto. In some implementations, the NC program 130 is output (potentially after conversion to a new program format 160) to the machining apparatus 170 to run on its local processor.

When generating the NC program 130, the CAM system can be used to assign spindle speed and/or feed rate parameters at each point from hundreds of points that make up a toolpath. Using these assigned parameters, the CAM system can generate NC programs 130, 160 that can gradually speed up and slow down spindle speed and feed rate of the machining tool across a set distance when approaching or leaving one or more predefined portions of the part. For example, speed up and slow down rates can be different for concave and convex faces of a part and/or for leading and trailing edges of the part. Note that determination of the values for the spindle speeds and feed rates can be determined based on material to be used for the part to be manufactured, the tool to be used, and any guidelines provided by the tool manufacturer for acceptable operational parameters for the tool. Testing can also be used determine appropriate speeds to be used with the tool for a given part to be manufactured. Note that components can have certain resonances based on how thick or thin they are, and the tools used in a CNC machine can generate different vibrational frequencies based on the speeds at which they are run when manufacturing a given part. Thus, testing can be used to avoid inappropriate harmonics being generated between the tool and the component.

Figure 3:
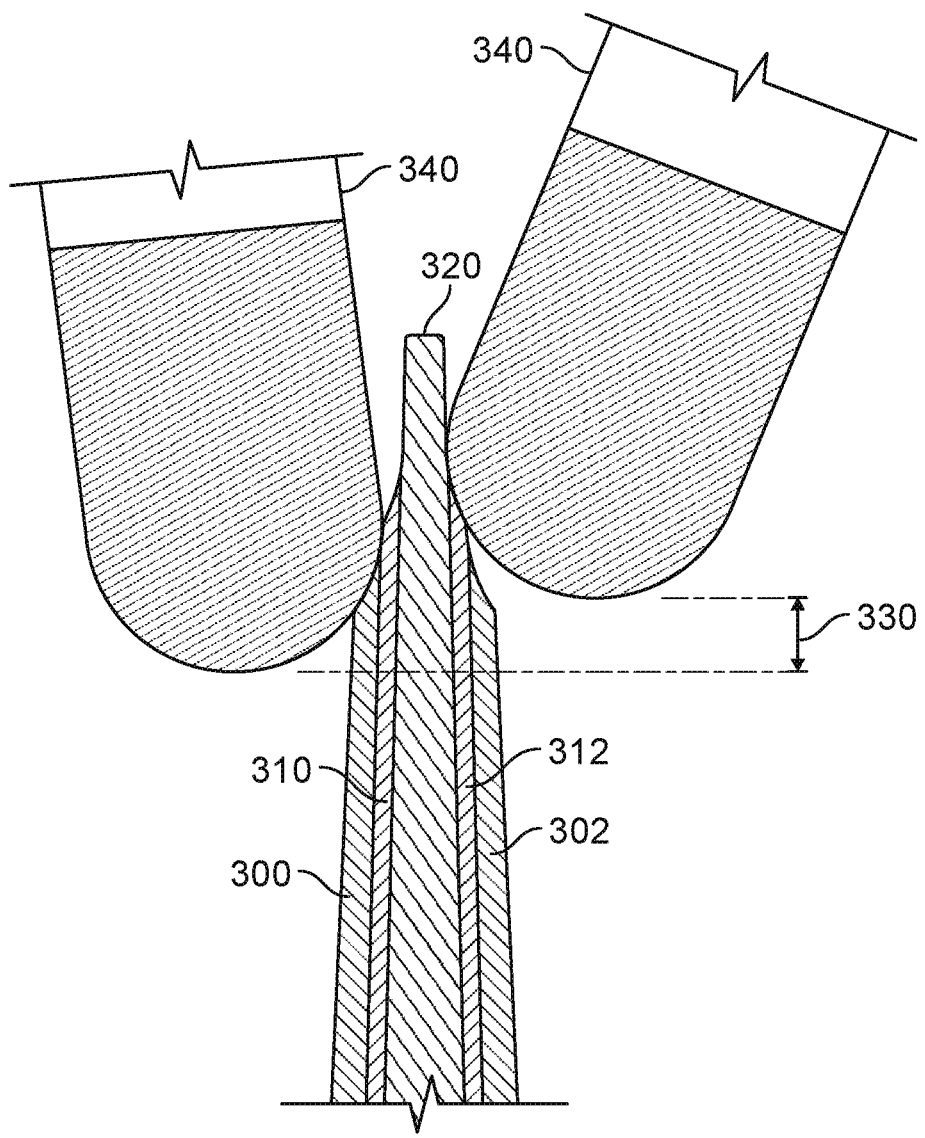
FIG. 3 shows an example of a support structure, in accordance with the systems and techniques of this disclosure, which can be created by a CNC milling process as a blade is machined.

FIG. 3 shows an example of a support structure, in accordance with the systems and techniques of this disclosure, which can be created by a CNC milling process as a blade is machined. As shown, support structure 300, 302 is constructed and used for the manufacture of a blade in a process that combines semi-finishing and finishing machining steps. A first small portion of the support structure 300, 302 is removed by a milling cutter 340 to reveal a semi-finishing thickness portion 310, 312 of the component being manufactured. Then, a first small portion of the semi-finishing thickness portion 310, 312 of the component is removed by the milling cutter 340 to reveal the finished blade 320. These alternating steps can be repeated down the entire length of the blade, such that the blade is self-supporting for the entire time the component is being semi-finished and finished, without the use of a terraced structure.

In this example, the portions removed in each of the alternating semi-finishing and finishing process steps are small, but this need not be the case in all implementations. In general, the step over/step down value used between the alternating semi-finishing and finishing can change based on the specific component (e.g., a specific aerofoil) being manufactured, surface finish requirements, and/or any cutting condition limitations. Note that the number of slices within any given toolpath can vary from being in the 10's, 100's, 1000's and beyond. However, using the systems and technique described herein, the semi-finishing slices proceed ahead of the finishing slices by as small an amount as possible, in light of the specific machining context, so as to provide the supporting structure and retained strength while machining the specific part (e.g., the specific aerofoil).

An offset distance 330 between semi-finishing and finishing toolpath segments allows the milling cutter 340 to perform the semi-finishing and finishing operations in close proximity to each other. An NC (Numerical Control) program that controls the milling cutter 340 contains both semi-finishing and finishing segments, and these segments alternate as they progress down the blade. This NC program includes an offset value for the offset distance 330 that allows a number of semi-finishing segments to be machined before alternating to a finishing segment and then back and forth between semi-finishing and finishing segments. In addition, the NC program can also contain multiple sets of spindle speed and feed rate controls that change and alternate depending on the segment either being semi-finishing or finishing type.

Figure 2A:
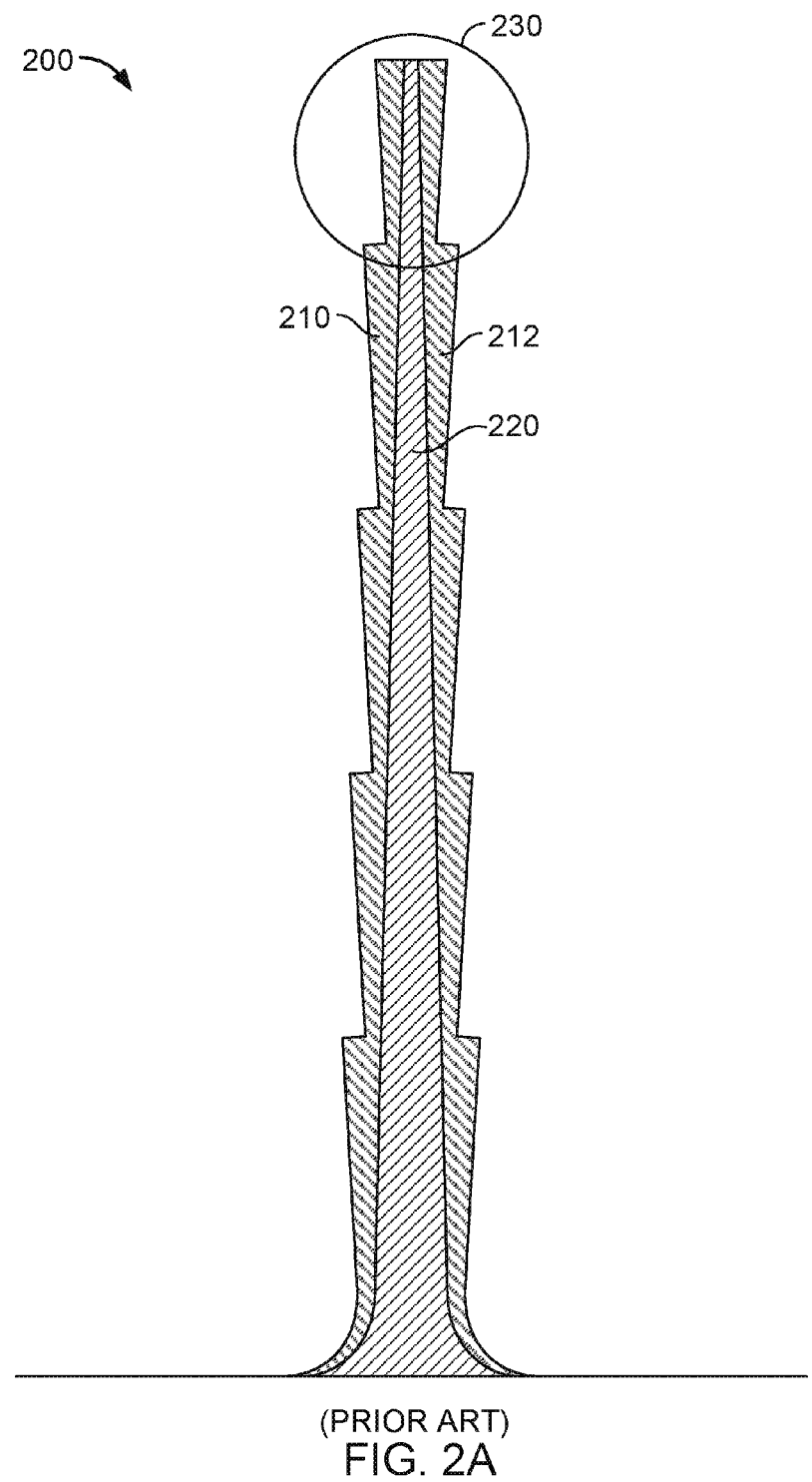
FIGS. 2A-2B show an example of a terraced support structure created by a traditional CNC milling process.
Figure 2B:
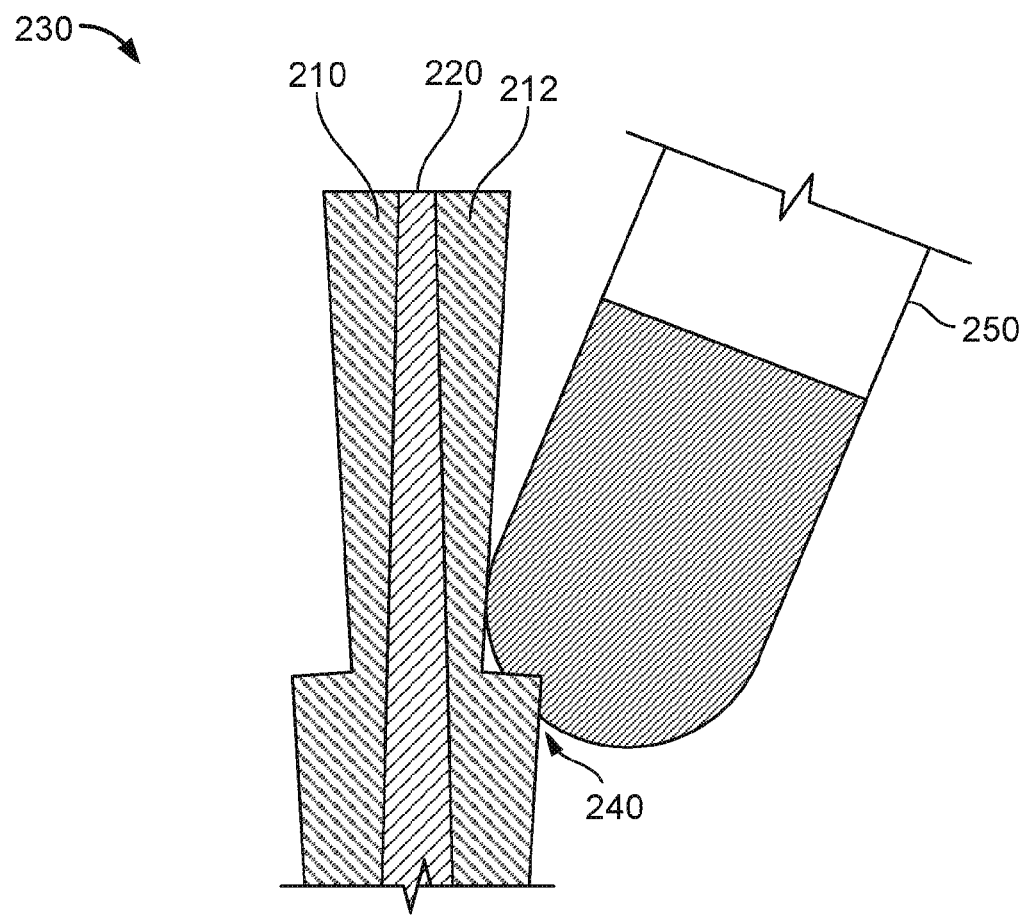

Use of this pre-machined support structure means that the blade is self-supporting as the machining process progresses down the blade. Note that the use of non-terraced stock (compare FIG. 3 with FIG. 2B) provides a consistent cutting condition for the cutting tool, which can improve tool life and component quality while also reducing machining time. The component can be semi-finished and finished using a single Numerical Control (NC) program that tracks fully around the blade and progresses until completion. In addition, this process can also be applied when machining the component in separate sections/levels and not all in one go.

In some implementations, the whole component can be finished at once, and not a side at a time, which can reduce distortion and increase quality. In some implementations, a whole blade can be finished at once and not in a level by level method, thus potentially eliminating possible distortion and miss-match between levels and increasing quality. In addition, the NC program can contain multiple sets of spindle speeds and feed rates for different segments of the semi-finishing and for the finishing, which enables fine-tuning to take place for the amount of material being removed, which can optimize surface finish, quality and cycle time for the component.

Figure 4A:
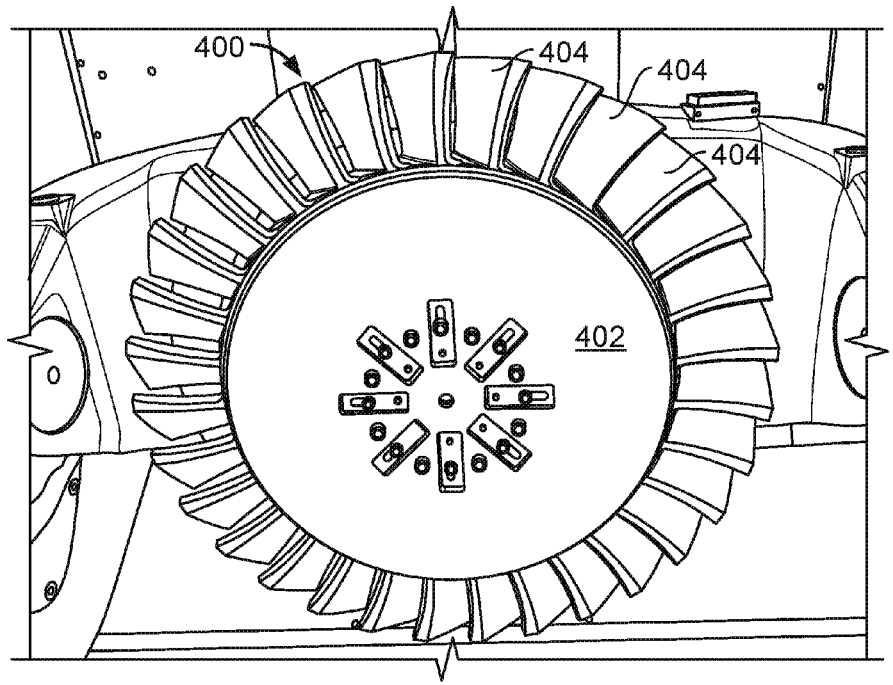
FIGS. 4A-4H show a detailed example of a blisk machined using the systems and techniques described herein.
Figure 4B:
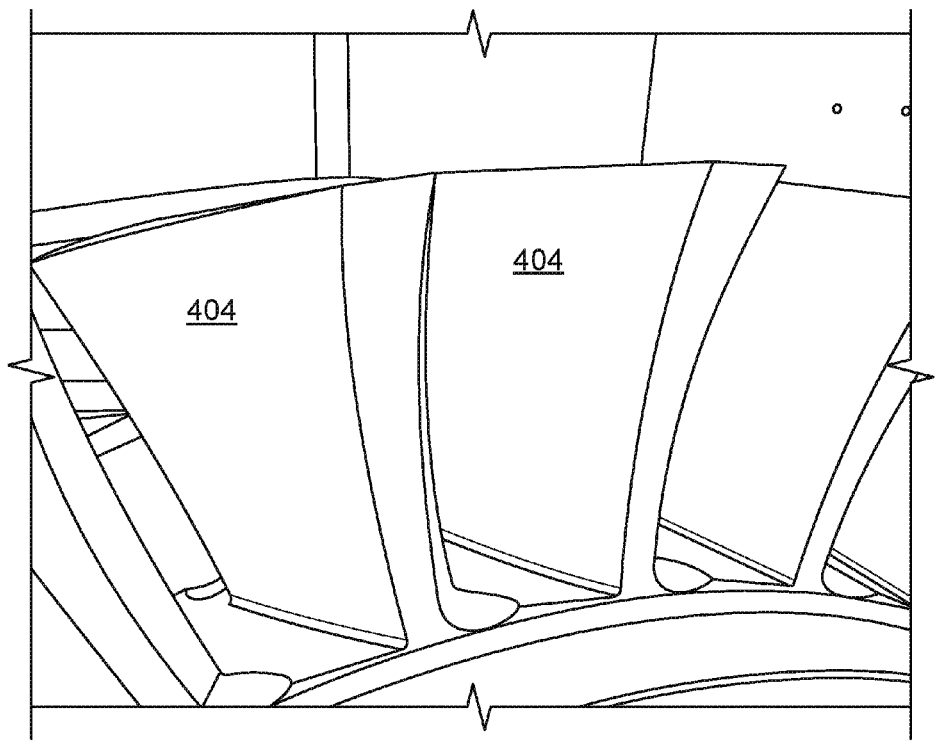

FIG. 4A shows an aero engine blisk 400 machined to a condition ready state for the systems and techniques described herein to begin. FIG. 4A shows a blisk, which is a disc 402 with roughed blades 404 (e.g., roughed aerofoils) made from rough stock material that is ready for finishing. FIG. 4B shows a close up of two roughed blades 404 with the same stock material as from FIG. 4A.

Figure 4C:
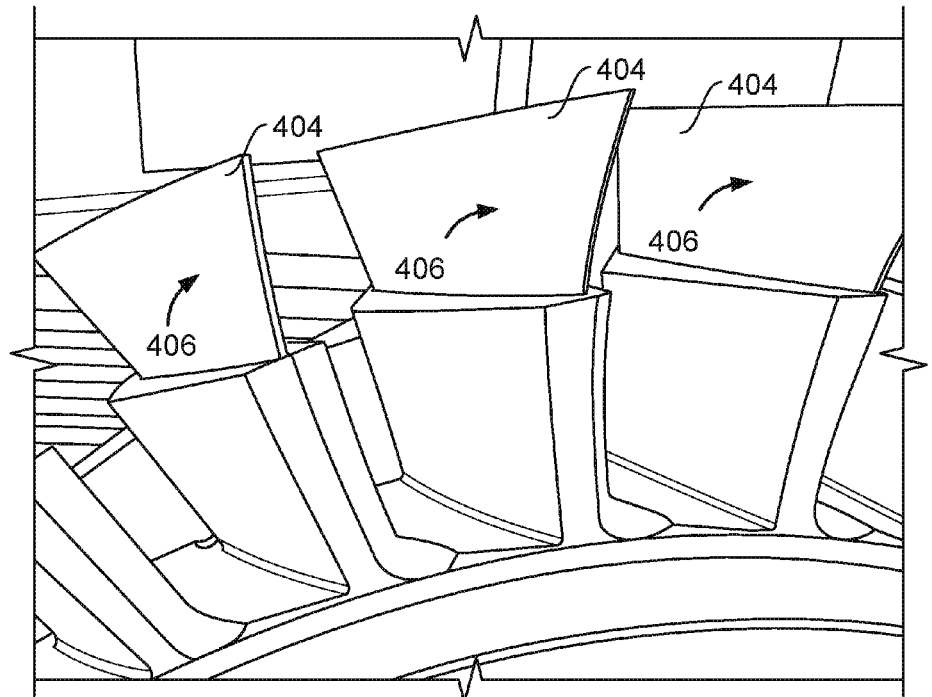

FIG. 4C shows a first level rough, where an initial section 406 of each blade 404 has been roughed to its near net shape, plus the stock material, e.g., stock material +0.6 mm. The blades 404 are now ready for the combined semi-finishing and finishing process.

Figure 4D:
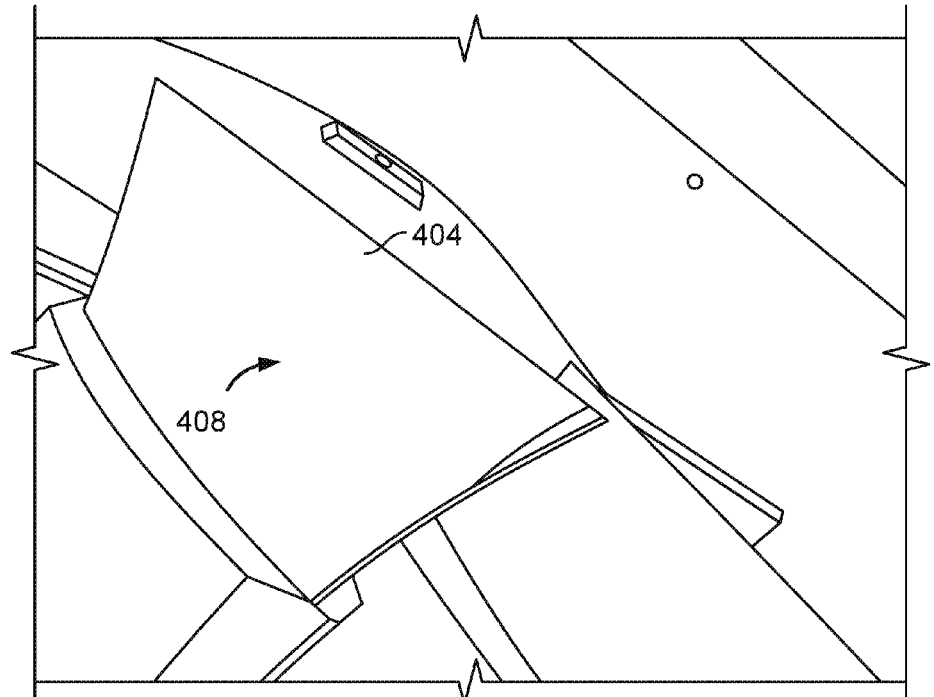

FIG. 4D shows a close up of a first level finish 408 of a blade 404, e.g., finished to +0.0 stock material. The first level of the blade 404 has been machined using the combined semi-finishing and finishing process, e.g., stock material +0.0 mm. The process provides a self-supporting structure, where each sub-level of this first level is semi-finished and then finished, and this alternating process progresses down to the bottom of this first level. Note that a traditional method would semi-finish all of the sub-levels of this level, progressing to the bottom of the first level and then repeat with the finishing. This means that after the traditional semi-finishing, +0.2 mm stock material would leave the blade 404 thinner, weaker and less stable for the finishing passes.

Figure 4E:
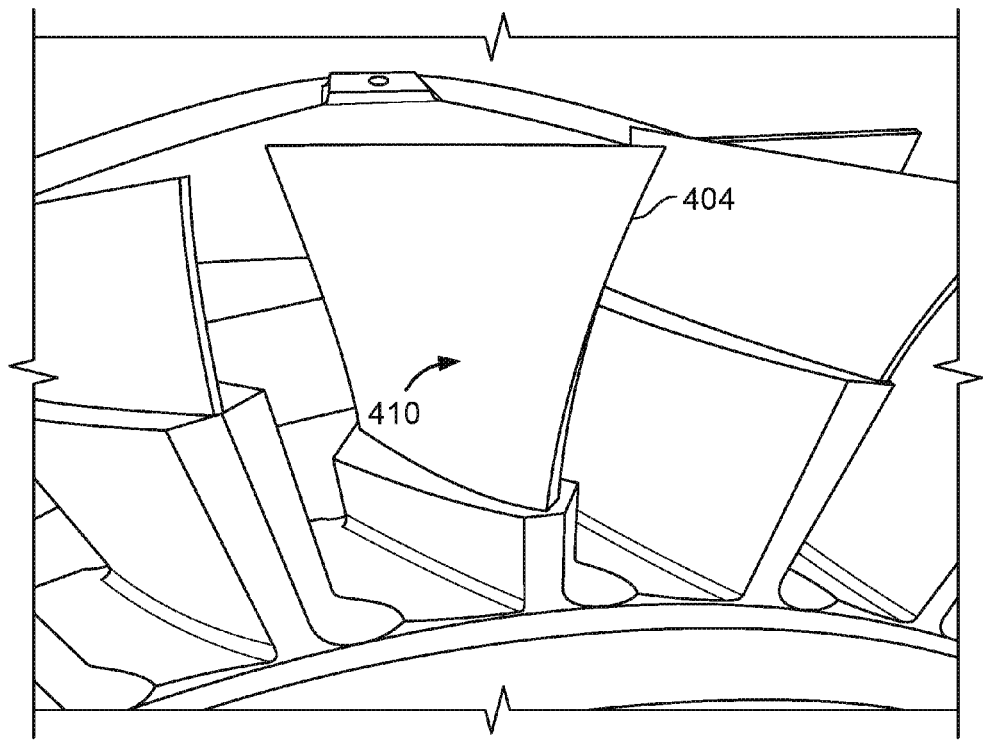

FIG. 4E shows a second level rough finish 410 of blade 404, roughed to near net material. The first level of the blade 404 on the blisk 400 is now finished, and the second level of the blade 404 is roughed to near net shape: stock material +0.6 mm. The blade 404 is now ready for the combined semi-finishing and finishing process again.

Figure 4F:
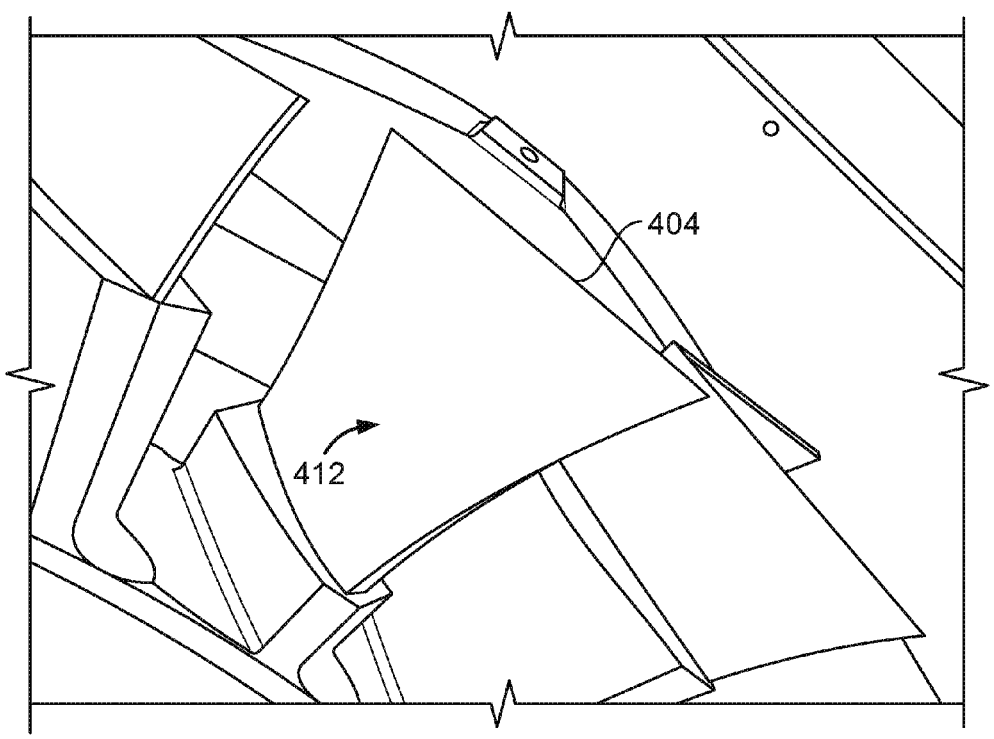

FIG. 4F shows a close up of the second level finish 412 of the blade 404, e.g., finished to +0.0 stock material. The second level of the blade 404 has been machined using the combined semi-finishing and finishing process, e.g., finished to stock material +0.0 mm. Again, the process provides a self-supporting structure, where each sub-level of this second level is semi-finished and then finished, and this alternating process progresses down to the bottom of this second level. As mentioned before, note that a traditional method would semi-finish all of the sub-levels of this level, progressing to the bottom of the second level and then continuing with the finishing. This means that, after the traditional semi-finishing, the +0.2 mm stock material would leave the blade 404 thinner, weaker and less stable for the finishing passes.

Figure 4G:
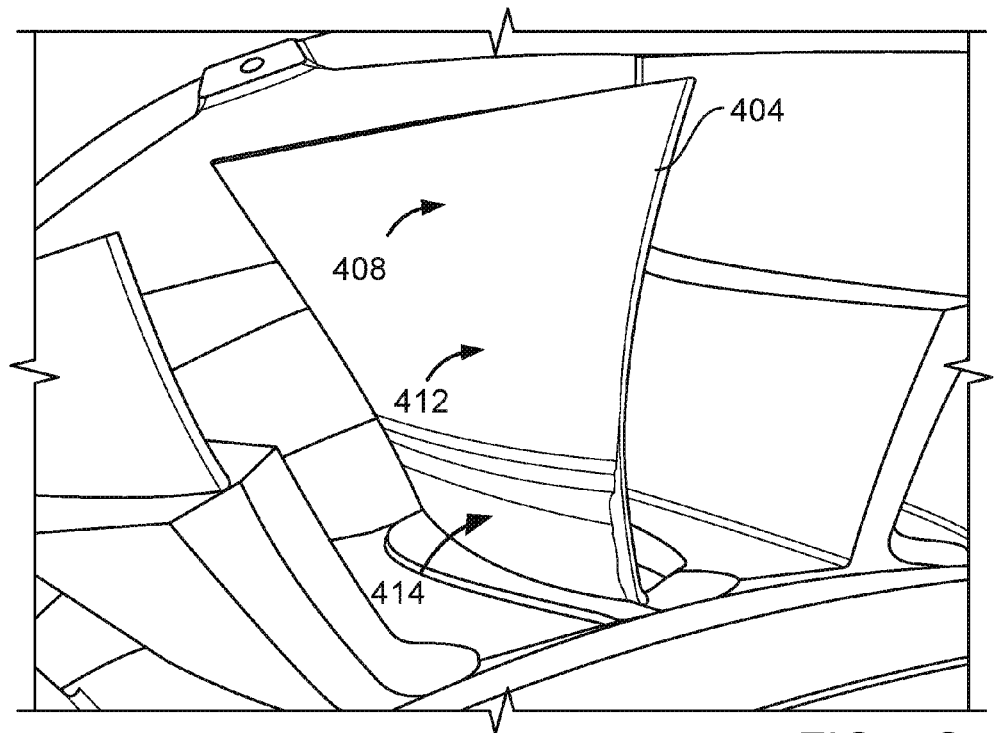

FIG. 4G shows a third level rough finish 414 of the blade 404, roughed to near net shape+stock material. The first and second levels of the blade 404 on the blisk 400 are now finished 408, 412, and the third level of the blade 404 is roughed to near net shape, e.g., to stock material +0.6 mm. The blade 404 is now ready for the combined semi-finishing and finishing process again.

Figure 4H:
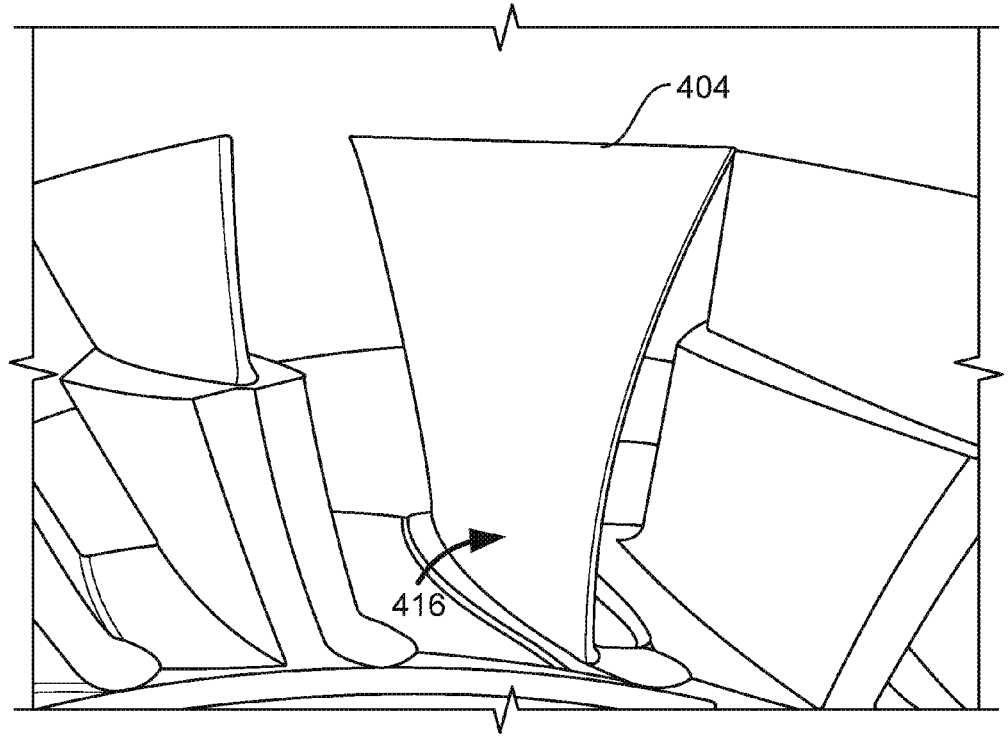

FIG. 4H shows a close up of the third level finish 416 of the blade 404, e.g., finished to +0.0 stock material. The third level of the blade 404 has been machined using the combined semi-finishing and finishing process, e.g., stock material +0.0 mm. Again, the process provides a self-supporting structure, where each sub-level of this third level is semi-finished and then finished, and this alternating process progresses down to the bottom of this third level. As mentioned before, note that a traditional method would semi-finish all of the sub-levels of this level, progressing to the bottom of the second level, and then repeat with the finishing. This means that, after the traditional semi-finishing, the +0.2 mm stock material would leave the blade 404 thinner, weaker and less stable for the finishing passes.

FIGS. 5A-5E collectively show a software simulation 500 of a combined semi-finishing and finishing process for a blade 502, in accordance with the detailed example of FIGS. 4A-4H. For example, FIGS. 5A-5E show the blade 502 in a close-up view of a blisk 504 being finished by a cutting tool 505. FIG. 5A shows an initial (in progress) semi-finishing 506 (e.g., roughed to +0.4 mm stock) in the combined semi-finishing and finishing process at a first level 508 (e.g., roughed to +0.6 mm stock). The blade 502 is visibly thinner at the top 510.

FIG. 5B shows an in-progress finishing 512 of the same initial portion of the blade 502 (e.g., after the cutting tool 505 has jumped back up to the top 510 of the blade 502 from the semi-finishing) in the combined semi-finishing and finishing process at the first level. As such, the cutting tool 505 has started to finish the blade 502 to +0.0 mm stock. Several semi-finishing passes have progressed down the blade 502, e.g., to +0.4 mm stock in a region 514, and a first level of the blade 502 has been roughed to +0.6 mm stock in a region 516. Again, the blade 502 is visibly thinner in the finished section at the top 510 due to the finishing. During this process, the blade 502 is more fully supported during finishing because of strength retained by having semi-finished stock (in the region 514) and rough stock (in the region 516) to support the blade 502 as the finishing 512 progresses down the blade 502.

FIG. 5C shows a resulting first level 518 of the blade 502 after the first level is done, at which time most of the blade's first level is fully finished, and small portions of the blade's first level remain at the semi-finished and roughed stock dimensions. In a region 520, for example, the first level of the blade 502 is now finished to +0.0 mm stock. Semi-finishing passes have progressed down the first level of the blade 502 to +0.4 mm stock in a region 522. The first level of the blade 502 has been roughed to +0.6 mm stock in a region 524. The second level of the blade 502 can now be roughed.

FIG. 5D shows an initial in-progress semi-finishing 526 in the combined semi-finishing and finishing process, now at the second level, after the second level has been roughed to +0.6 mm stock down to a region 532. In an upper region, the first level of the blade 502 is now finished to +0.0 mm stock, and the combined semi-finishing and finishing process resumes, e.g., in a region 530, with a semi-finishing pass 526 to +0.4 mm stock proceeding down to a position 534.

FIG. 5E shows an in-progress finishing 528 performed after the first semi-finishing pass 526. After this first semi-finishing pass, the cutting tool 505 jumps back up to a higher position on the blade 502 to machine a finishing pass 528. Note that bottom positions 534 and 536 of the cutting tool 505, in FIGS. 5D and 5E, respectively, are different with reference to the rough +0.6 mm stock, when performing a semi-finishing pass versus a finishing pass. This difference corresponds to the offset distance 330 discussed above.

In addition, the semi-finishing and finishing toolpaths can have different spindle speeds and feed rates. In some implementations, more than one set of spindle speeds and feed rates can be included for the semi-finishing and finishing toolpaths. This can help, for example, when machining around the leading and/or trailing edges of an aerofoil, where it may be desirable to slow the machine feed rate and spindle speed accordingly. In some implementations, any given toolpath can have two sets of spindle speeds and feed rates, e.g., one for the concave and convex faces, and another for the leading and trailing edges. In addition, in some implementations, the spindle speeds and feed rates can be gradually sped up and/or slowed down across a set distance when approaching or leaving the leading or trailing edge (e.g., corners). This can reduce or eliminate undesirable marks on the component surface that may be caused by sudden accelerations/decelerations. In some implementations, spindle speeds and feed rates can vary for other reasons, e.g., based on the type, strength and/or thickness of the material being tooled.

Figure 6A:
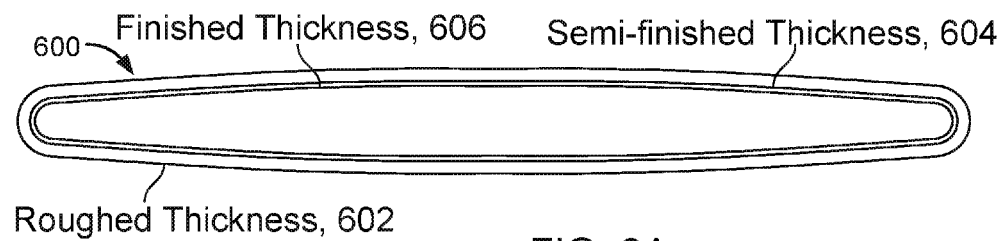
Figure 6B:
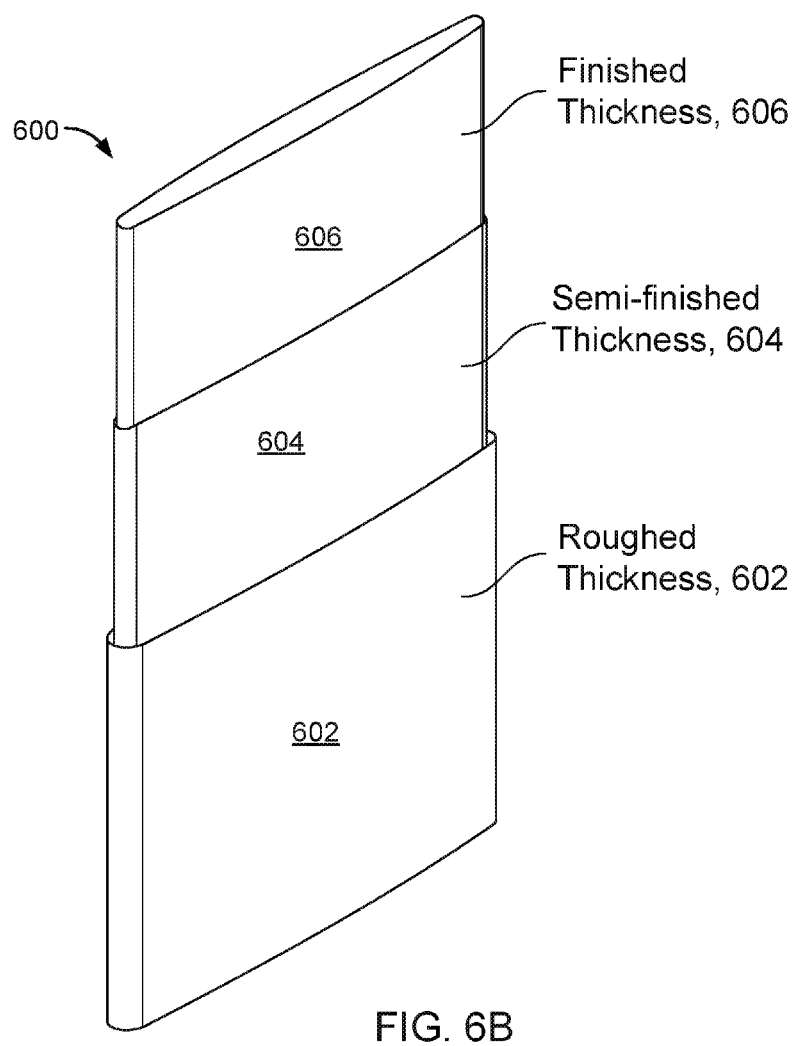

FIGS. 6A-6F compare various machining processes 601a-601d with reference to a generalized aerofoil 600. FIG. 6A shows a cross-section of the generalized aerofoil 600 with a roughed thickness 602, a semi-finished thickness 604, and a finished thickness 606. FIG. 6B shows a perspective view of the generalized aerofoil 600 with its roughed, semi-finished, and finished thicknesses. Note that, as the aerofoil 600 gets thinner and thinner, the aerofoil 600 can become more unstable and harder to machine. This can have adverse effects on the surface finish, accuracy, geometry shape, and tool life.

FIG. 6C shows a traditional single pass process 601a, in which the CNC system can attempt to machine the aerofoil 600 from a top 608 to a bottom 610 in a single pass for each of three distinct processes: (1) roughing 612 from top to bottom, (2) semi-finishing 614 from top to bottom, and (3) finishing 616 from top to bottom. Use of this approach, for example, can cause the aerofoil 600 to get thinner and thinner over the whole surface area of the aerofoil 600, leaving it weak and unsupported.

FIG. 6D shows a traditional multiple pass process 601b, in which the CNC system machines the aerofoil 600 in separate levels. This can allow each level to be handled in three distinct processes: (1) roughing 618 a next level, (2) semi-finishing 620 this next level, and (3) finishing 622 this next level. When using this approach, the aerofoil 600 is no longer getting thinner and thinner over the whole surface area of the aerofoil 600, but this is still occurring within each level. Thus, the processes' leaving of the aerofoil 600 weak and unsupported is reduced to a smaller localized area. This is helpful, but the process of splitting the aerofoil 600 up into so many levels can lead to other problems. For example, the use of multiple levels can result in creating multiple blend regions that may require the cutting tool to blend back into the previous level perfectly without mismatch. Also, each time the rough and semi-finished stock is removed, localized distortion of the aerofoil 600 can occur, which means the chance of blending to the previous level perfectly may be reduced, and the end shape of the aerofoil 600 may not be correct.

FIG. 6E shows a single pass process 601c in accordance with the systems and techniques described in this disclosure. The semi-finishing and finishing of the aerofoil 600 can be performed together. This can allow the aerofoil 600 to be machined in a single pass/level with only two distinct processes: (1) roughing 624 from top 608 to bottom 610 and (2) semi-finishing and finishing 626 from top 608 to bottom 610. Use of this single pass/level can lead to zero blend regions and zero mismatch between blends. Thus, there may be less post-machining processing, such as polishing. Moreover, this approach can result in improved cutting tool life and less chance of geometry distortions. Thus, the finished aerofoil 600 can be more accurate.

FIG. 6F shows a multiple pass process 601d in accordance with the systems and techniques described in this disclosure, where the CNC system machines the aerofoil 600 in separate levels, but the semi-finishing and finishing of the aerofoil 600 at each level are performed together. Thus, the aerofoil 600 is machined in levels, but each level includes only two distinct processes: (1) roughing 628 a next level and (2) semi-finishing and finishing 630 this next level. The use of this approach can result in fewer levels being needed. Also, there can be fewer blend regions and less mismatch between blends, the cutting tool life can be improved, and there can be less chance of geometry distortion. Likewise, the finished aerofoil 600 can be more accurate, and there can be less need for post-machining processing, such as polishing. Moreover, in both the approaches of FIG. 6E and FIG. 6F, combining of the semi-finishing and finishing means that the strength of the aerofoil 600 can be maintained, since the thickness of the semi-finished stock is retained as the CNC tool progresses down the aerofoil 600.

In addition, when combining the semi-finishing and finishing described above, a large number of parameters can be applied to the toolpath that a machine tool can react to such as, but not limited to, spindle speed and feed rate. This can be important because, when a semi-finishing cut is taking place, the cutting conditions are significantly different from those of finishing. This can include factors such as the amount of stock being removed, the stepover/stepdown of the cutting tool, and the resonance frequency of the aerofoil 600 at any given point. Thus, it may be less than ideal to run a semi-finishing pass using the same spindle speed and feed rate parameters as used in a finishing pass.

Figure 7A:
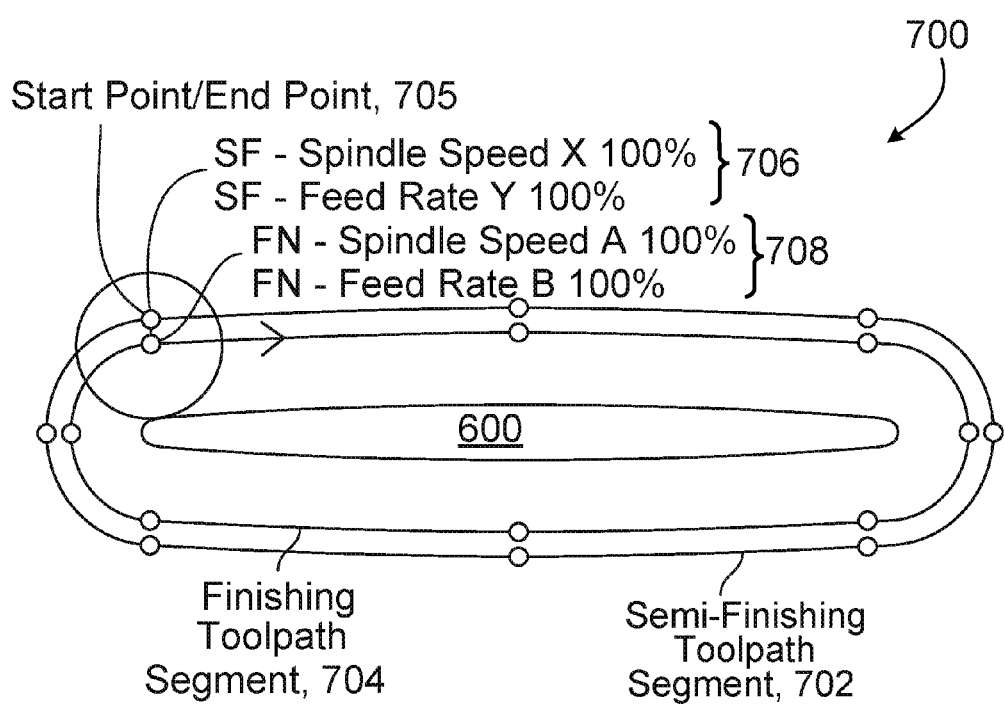
FIGS. 7A-7B show top views of examples of toolpaths with respect to the generalized aerofoil of FIG. 6A.
Figure 7B:
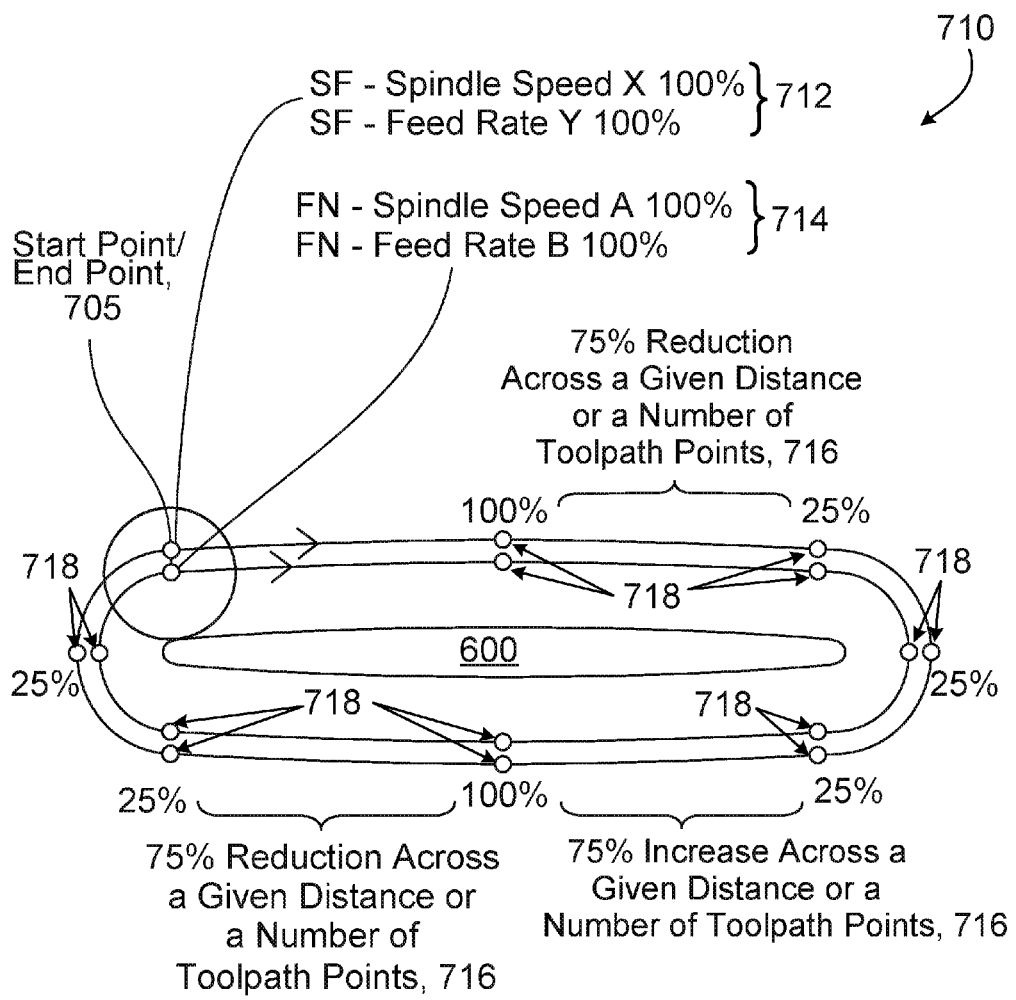

FIGS. 7A-7B show top views of examples of toolpaths 700 with respect to the generalized aerofoil 600 of FIG. 6A. For example, the toolpaths 700 include a semi-finishing toolpath segment 702 and a finishing toolpath segment 704. Machine tool toolpaths can consist of many individual segments, and in turn those segments can be made up of many small linear segments, each with a start and end point 705. Traditional toolpaths are given a single spindle speed and feed rate for the entire toolpath and all of the segments that it contains. In contrast, FIG. 7A shows toolpaths with spindle speed and feed rate control with different combinations 706 and 708 for spindle speed (X and A) and feed rate (Y and B) for the semi-finishing (SF) toolpath segment 702 and the finishing (FN) toolpath segment 704, respectively, but they are nonetheless constant for the entire segment. For example, the spindle speed and feed rates can be 100% for each of the combinations 706 and 708. In some implementations, even finer control or other types of control can be provided.

FIG. 7B shows toolpaths 710 with spindle speed and feed rate control with different combinations 712 and 714 for spindle speed and feed rate for semi-finishing and finishing, respectively. Further, the spindle speed and feed rate can also constantly vary as the cutting tool travels around the toolpath segment. For example, there can be a 75% reduction 716 of spindle speed and feed rate across a given distance or over a number of toolpath points 718.

In some implementations, the semi-finishing and finishing passes can be isolated and assigned unique spindle speed and feed rate values that are tuned to the cutting conditions required for the aerofoil or even specifically for the pass\level being machined at that time. Further, in addition to the ability to instantly change spindle speed and feed rate, it may be desirable to gradually change the spindle speed and feed rate over the course of the toolpath segment. This is useful because an instant change may be hard for a machine tool to perform (a spindle requires time to speed up or slow down), and suddenly changing either of these two parameters while in cut can potentially mark or damage the surface of the aerofoil.

Thus, gradually changing the spindle speed and feed rate over a given distance from point A to point B can give the machine tool time to react and eliminate and surface marking on the aerofoil. This can be very useful when machining at very high feed rates and trying to machine around sharp corners. Machine tools cannot always maintain the high feed rate around the sharp corner. In the traditional case, the spindle will not know to reduce its speed to compensate for the machine tool moving at a reduced feed rate around the corner, and this can lead to vibration, surface marking and cutting tool damage.

Thus, in some implementations, the CAM system can assign a large number of different commands to every toolpath point, including assigning a different spindle speed and feed rate to each toolpath point. This can facilitate fine control over of the CNC tool as it moves along the toolpath, including the ability to gradually speed up and slow down the spindle speed and feed rate as desired based on the part being manufactured. This can provide one or more of the following benefits: fine-tuning of semi-finishing segments, fine-tuning of finishing segments, increased machine tool performance, improved surface finish, reduced surface marking, and improved cutting tool life.

Figure 8:
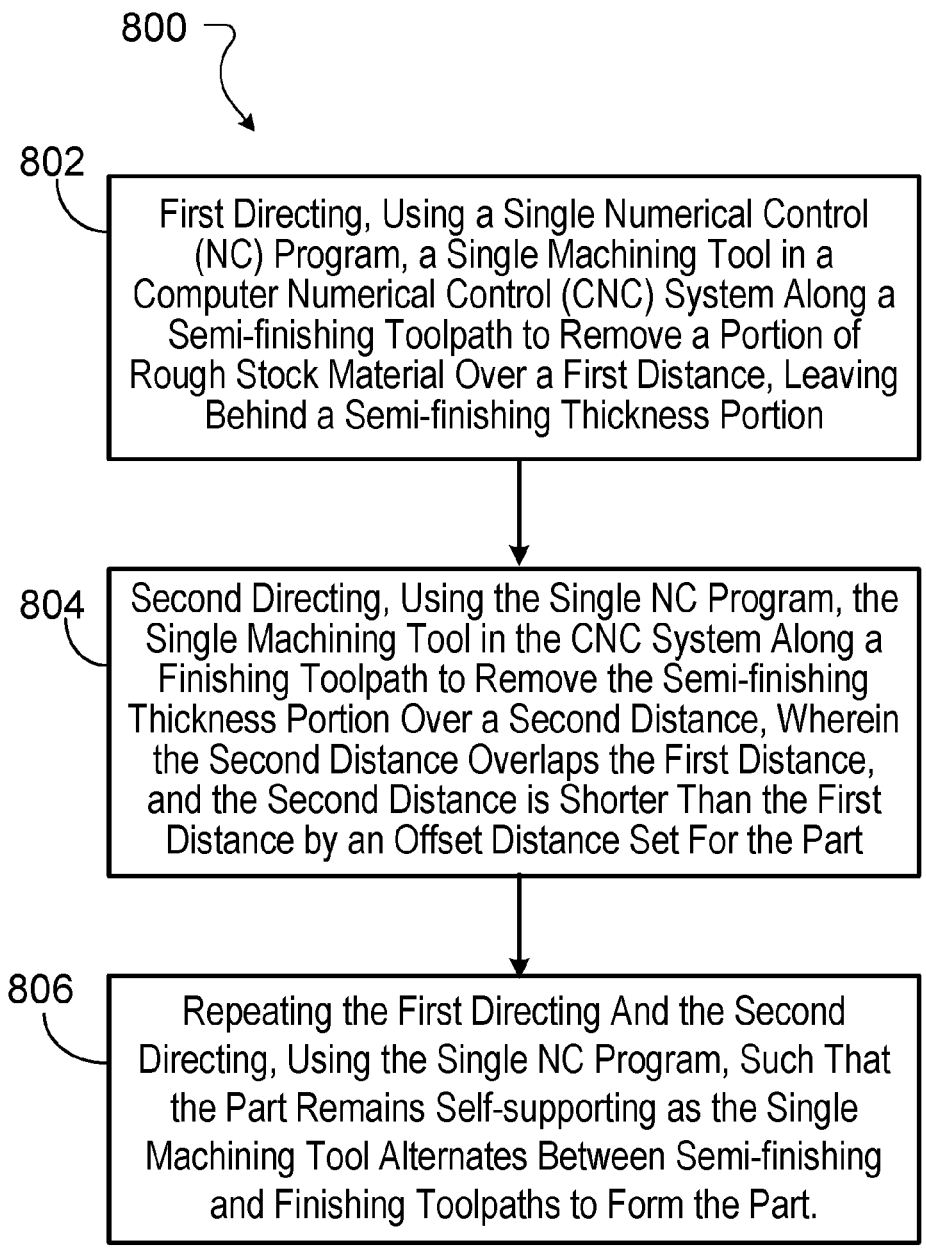
FIG. 8 is a flow diagram of an example method for machining a part using a CNC system.

FIG. 8 is a flow diagram of an example method 800 for machining a part using a CNC system. For example, the method 800 can be used for machining the blade 404 described with reference to FIGS. 4A-4H, the blade 502 described with reference to FIGS. 5A-5E, and the aerofoil 600 described with reference to FIGS. 6A-6F. The method 800 can be used, for example, in the manufacture of blades, blisks, aerofoils, and other parts.

Using a single NC program, a single machining tool is first directed in the CNC system along a semi-finishing toolpath to remove a portion of rough stock material over a first distance, leaving behind a semi-finishing thickness portion (802). For example, referring to FIG. 5A, through use of the cutting tool 505 in several semi-finishing passes, the blade 502 has been tooled to +0.4 mm stock from a roughed +0.6 stock.

Using the single NC program, the single machining tool is second directed in the CNC system along a finishing toolpath to remove the semi-finishing thickness portion over a second distance, wherein the second distance overlaps the first distance, and the second distance is shorter than the first distance by an offset distance set for the part (804). For example, referring to FIG. 5B, through use of the cutting tool 505 in several finishing passes, the blade 502 has been tooled to +0.0 mm stock from +0.4 stock. This occurs, for example, while only part of the blade has undergone semi-finishing passes. The offset distance, for example, can be the offset distance 330, which corresponds to a difference in the bottom positions 534 and 536 shown in FIGS. 5D and 5E.

The first directing and the second directing are repeated, using the single NC program, such that the part remains self-supporting as the single machining tool alternates between semi-finishing and finishing toolpaths to form the part (806). For example, referring to FIGS. 5C-5E, sequences of several semi-finishing passes followed by several finishing passes are repeated. During this time, the blade 502 is tooled to +0.4 mm stock from +0.6 mm stock in the semi-finishing passes, and the blade 502 is tooled to +0.0 mm stock from +0.4 mm stock in the finishing passes. In some implementations, first directing can consist of performing two to five semi-finishing slices, and the second directing can consist of performing two to four finishing slices.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A method for machining a part using a Computer Numerical Control (CNC) system, the method comprising:
first directing, using a single Numerical Control (NC) program, a single machining tool in the CNC system along a semi-finishing toolpath to remove a portion of rough stock material over a first distance, leaving behind a semi-finishing thickness portion;
second directing, using the single NC program, the single machining tool in the CNC system along a finishing toolpath to remove the semi-finishing thickness portion over a second distance, wherein the second distance overlaps the first distance, and the second distance is shorter than the first distance by an offset distance set for the part; and
repeating the first directing and the second directing, using the single NC program, such that the part remains self-supporting as the single machining tool alternates between semi-finishing and finishing toolpaths to form the part;
wherein the single NC program contains multiple sets of spindle speed and feed rate controls that change depending on a current segment being either a semi-finishing segment or a finishing segment, the single NC program specifies within the multiple sets of spindle speed and feed rate controls a first set of spindle speed and feed rate values for the semi-finishing toolpath and a second set of spindle speed and feed rate values for the finishing toolpath, wherein the first set of spindle speed and feed rate values are different from the second set of spindle speed and feed rate values;
wherein the part is a blade or an aerofoil, the rough stock material is a non-terraced rough stock for the blade, each of the first directing and the second directing tracks fully around the blade, and the repeating continues for a full length of the blade until completion.

2. The method of claim 1, wherein the first directing consists of performing two to five semi-finishing slices, and the second directing consists of performing two to four finishing slices.

3. The method of claim 1, wherein the part is an aerofoil, and the single NC program uses the multiple sets of spindle speed and feed rate controls to slow the single machining tool feed rate and spindle speed around leading and trailing edges of the aerofoil.

4. The method of claim 1, wherein the multiple sets of spindle speed and feed rate controls comprise a first spindle speed and feed rate for concave and convex faces of the part, and a second spindle speed and feed rate for leading and trailing edges of the part.

5. The method of claim 1, wherein the semi-finishing toolpath includes semi-finishing segments, the finishing toolpath includes finishing segments, the first set of spindle speed and feed rate values includes different spindle speed and feed rate values for different ones of the semi-finishing segments, and the second set of spindle speed and feed rate values includes different spindle speed and feed rate values for different ones of the finishing segments.

6. The method of claim 1, comprising gradually speeding up and slowing down spindle speed and feed rate of the machining tool, by the same NC program, across a set distance when approaching or leaving one or more predefined portions of the part.

7. The method of claim 6, wherein the one or more predefined portions of the part comprise corners of the part.

8. The method of claim 6, wherein the one or more predefined portions of the part comprise leading and trailing edges of the part.

* * * * *

UNITED STATES PATENT AND TRADEMARK OFFICE
CERTIFICATE OF CORRECTION

PATENT NO. : 9,776,255 B2
APPLICATION NO. : 15/146617
DATED : October 3, 2017
INVENTOR(S) : Ian Darren Caldicott It is certified that error appears in the above-identified patent and that said Letters Patent is hereby corrected as shown below:

On the Title Page

Column 2 (Assistant Examiner): Delete "Amanda Meneghin" and insert --Amanda Meneghini--, therefor.

In the Claims

Column 14, Line 13, in Claim 7: Delete "comers" and insert --corners--, therefor.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*